US006069968A

United States Patent

Shaw et al.

[11] Patent Number: 6,069,968
[45] Date of Patent: May 30, 2000

[54] ELECTRONIC TRANSACTION SYSTEM FOR BANKING, SECURITY, AND/OR CHARGE CARD

[76] Inventors: Venson M. Shaw; Steven M. Shaw, both of 111 Reldyes Ave., Leonia, N.J. 07605

[21] Appl. No.: 08/986,212

[22] Filed: Dec. 5, 1997

Related U.S. Application Data

[63] Continuation-in-part of application No. 08/208,992, Mar. 11, 1994, Pat. No. 5,745,598.

[51] Int. Cl.[7] .................................................... G06K 9/00
[52] U.S. Cl. .................... 382/119; 235/380; 340/825.34; 902/3
[58] Field of Search .................. 382/115–116, 119–123, 382/100; 340/825.3, 825.34; 356/71; 235/380, 382, 379; 902/3–5

[56] References Cited

U.S. PATENT DOCUMENTS

| | | | |
|---|---|---|---|
| 4,757,549 | 7/1988 | Machart et al. | 382/119 |
| 5,111,512 | 5/1992 | Fan et al. | 382/122 |
| 5,559,895 | 9/1996 | Lee et al. | 382/119 |
| 5,680,470 | 10/1997 | Moussa et al. | 382/119 |
| 5,705,993 | 1/1998 | Alesu | 382/120 |
| 5,745,598 | 4/1998 | Shaw et al. | 382/119 |

*Primary Examiner*—Bhavesh Mehta

[57] ABSTRACT

A signal identification system for arbitrary contour, wherein personalized—contour signal is applied for the identification—of an individual user, entity, device, or phenomena. Said personalized identification signal does not disclose the physical shape information of the signal, and only requires simple computation and little data storage. Said signal identification system employs a portable storage device and/or network to store, download, or retrieve features and/or parameters according to a predefined signal template, wherein said parameters are used for simplification of processing of an incoming test signal, said features are used for verification of said incoming test signal for conforming the identity of said individuals. Said signal identification system supports a single or plurality of individuals, and allows each individual to select an unique personalized-identification-signal which represents the unique identity of said individual. Said personalized identification signal does not limit to the original signature of said user, and includes arbitrary contour signal which can be repeatable and/or memorized by said individual.

10 Claims, 4 Drawing Sheets

11

12

13

14

ELECTRONIC TRANSACTION SYSTEM FOR BANKING, SECURITY, AND/OR CHARGE CARD

This application is a Continuation-In-Part of prior application Ser. No. 08/208,992 filed Mar. 11, 1994, now U.S. Pat. No. 5,745,598.

BACKGROUND OF THE INVENTION

1. Field of the Invention

The present invention is directed in general to a system using verification/authentication of Personal Identification Signal for banking, security and charge card transactions, and more particularly to a system which employs a low-capacity portable memory device to store set of features and parameters extracted from a Signal template. Said parameters are used to simplify processing incoming Signal, while said features are for verification/authentication of incoming Signal by the system.

2. Description of the Background Art

Personal Identification Number (PIN) is widely used in automatic teller machines, and in many other security devices where only authorized users are allowed to perform selective actions. However, PIN has some disadvantages, and these become very inconvenient for the users. This is because:

PIN usually contains many digits which can be easily forgotten disclosed PIN can be used (and misused) by any unauthorized person when special equipment is used, PIN can be directly read from a memory device (e.g. from magnetic cards) by an unauthorized person.

The overall performance of the systems could be significantly enhanced if PIN is substituted/supplemented by Personalized Identification Signal (PIS) which does not have to be the original signature of a person. It is recommended that PIS would actually be any hand-drawn contour picture which is easily repeatable and can be easily memorized. Nevertheless, a system utilizing a PIS concept should be equipped with a signature verification module although the complexity of the module could be significantly reduced.

Most of the already proposed systems for automatic recognition (verification, authentication) of hand-written signatures utilize the dynamic description of contour images, where both the position (horizontal and vertical coordinates) and the motion (time-domain coordinates) of the tip a drawing device (stylus) are sensed and memorized.

The dynamic description of signatures have been addressed by numerous practitioners including, for example, U.S. Pat. No. 5,111,512, issued to Fan et al. on May 5, 1992, U.S. Pat. No. 4,607,386, issued to Morita et al. on Aug. 19, 1986, U.S. Pat. No. 5,054,088, issued to Gunderson et al. on Oct. 01, 1991, U.S. Pat. No. 5,101,437, issued to Plamondon on Mar. 31, 1992, and U.S. Pat. No. 4,495,644, issued to Parks et al. on Jan. 22, 1985. Usually, in the systems of automatic verification/authentication of personal signatures, the dynamic description is used to perform segmentation of an incoming signature, i.e. to extract a sequence of strokes from said signature. Then, the feature-based description of said signature is created, i.e. the signature is represented by a sequence of values characterizing selective properties of the extracted strokes and of the whole signature. The number of utilized features can be significantly large. For example, Parks et al. in U.S. Pat. No. 4,495,644 disclose 93 features useful in the analysis of a signature. Moreover, the nature of features utilized is very diversified. They include features directly describing shapes of signatures (spatial and time-domain coordinates of the contour) as well as features characterizing the drawing process (profiles of velocity, acceleration and pressure of the stylus).

In a verification system, the feature-based description of an incoming signature is compared with the feature-based description of the signature template to decide whether or not the incoming signature can be accepted. The signature template description can be either retrieved form a database containing templates of all the eligible users, or can be furnished by a customer (using a portable memory device).

The first approach is described, for example, by Parks et al. in U.S. Pat. No. 4,495,644. However, a typical signature verification/authentication system consists of many autonomous verification units (e.g. ATM machines, security check points) which have only limited access or no access at all to the central unit (e.g. the mainframe computer of a banking system). Obviously, the verification units would not have any database containing signature templates for all the eligible customers.

The second approach is reported, for example, by Gunderson et al. in U.S. Pat. No. 5,054,088, and by Haraguchi in U.S. Pat. No. 5,150,420. However, such approach may require extensive memory capacity due to the requirement for storing the entire physical data of the template and/or complex feature-based description of the template. The existing systems of magnetic cards or similar portable memory devices have too limited memory capacities to incorporate this option.

Moreover, the verification units are usually equipped with inexpensive computing devices only. Therefore, the algorithms of signature verification are either too complex to incorporate in the verification units, or the reliability of these algorithms becomes too limited. This is first because of the number and complexity of features, and secondly because segmentation algorithms require complex mathematical operation of incoming signatures in order to determine the appropriate number of extracted strokes and their location within the signature.

As a result, the present system methods to date impose severe limitations and significant disadvantages for practical implementation. It would therefore be highly desirable to further propose novel system method with particular technological innovations for the dynamic processing, verification and authentication of binary contour image. This will lead towards the improvement of the overall system operation efficiency and productivity for the computerized banking, security, charge card transaction, and/or related industries.

SUMMARY OF THE INVENTION

The limitation and disadvantages in the prior art are overcome in the present invention disclosed herein, by:

(a) proposing a Personalized Identification Signal (PIS) concept, wherein PIS is an easily repeatable handwritten contour which is different from a person's signature used for signing documents;

(b) creating a description of a PIS template, wherein the description consists of selective parameters representing results of segmentation of the PIS template, and of selective feature measurements characterizing strokes created by said segmentation;

(c) memorizing said description of a PIS template using low-capacity portable memory device;

(d) using parameter-controlled segmentation algorithms to process incoming Signal and then to compute features for the segmented incoming Signal in order to compare said features with the feature measurements of the PIS template to decide whether or not the incoming Signal can be accepted, wherein said parameters and feature measurements are retrieved from said portable memory device furnished by a customer.

It is therefore an object of the present invention to provide improved system apparatus and method for improving automatic banking, security, and/or charge card transaction, wherein a concept of Personal Identification Signal (PIS) is introduced.

It is further an object of the present invention to include an arbitrarily selective geometrical contour as a physical representation of the above-mentioned Personal Identification Signal.

It is still further an object of the present invention to provide improved system apparatus and method for verification of Personal Identification Signal which include both spatial and time-domain coordinates.

It is still further an object of the present invention to provide improved system apparatus and method for representation of a PIS template with symbolic representation without disclosure of original physical shape for said PIS template.

It is therefore an object of the present invention to define a selective set of parameters for the normalization and segmentation of Personal Identification Signal, wherein said parameters are included into said representation of a PIS template.

It is still further an object of the present invention to define a selective set of features for representing results of segmentation of Personal Identification Signal, wherein corresponding feature measurements are included into said representation of a PIS template.

It is still further an object of the present invention to define an improved portable storage device, and retrieval method and apparatus for data of said representation of a PIS template.

It is still further an object of the present invention to define an improved computation method employing said normalization and segmentation parameters for normalizing and segmenting incoming Personal Identification Signal, wherein said parameters are retrieved from said portable storage device.

It is still further an object of the present invention to define an improved hardware computing apparatus employing said normalization and segmentation parameters for normalizing and segmenting incoming Personal Identification Signal, wherein said parameters are retrieved from said portable storage device.

It is still further an object of the present invention to define an improved computation method for producing feature measurements for said features for incoming Personal Identification Signal.

It is still further an object of the present invention to define an improved hardware computation apparatus for producing feature measurements for said features for incoming Personal Identification Signal.

It is still further an object of the present invention to define an improved method of comparing said feature measurements produced for incoming Personal Identification Signal with said feature measurements retrieved from said portable storage device for verification/authentication of said incoming Personal Identification Signal.

A preferred embodiment of the present invention consists of a central processing unit, and of many autonomous verification units (e.g. ATM machines, security check points) equipped with an inexpensive computing device. Both the central processing unit and verification units are equipped with an input device (tactile sensor) to capture and memorize spatial and time-domain coordinates of incoming contour images (Personal Identification Signal).

An incoming contour image captured and memorized within the central is considered a Personal Identification Signal template (PIS template). The PIS template is processed accordingly in order to extract the optimum set of strokes, and to calculate the corresponding normalization and segmentation parameters. The computational complexity of the processing algorithm is very high, but these calculation are required to be performed only once. An example of the processing algorithms is described in details in the patent application Ser. No. 08/208,992, filed Mar. 11, 1994, now U.S. Pat. No. 5,745,598. Then, the selective feature measurements are computed for the extracted strokes. Said feature measurements describe selective shape properties of the extracted strokes. Said normalization parameters, segmentation parameters, and feature measurements are memorized into a portable storage device which is issued to the customer who entered the PIS template. The overall amount of stored data is very small (typically not more than 80 bytes) so it can be memorized using existing systems of portable memory devices like magnetic cards. A very important property of the memorized representation of a PIS template is that it contains no direct information about the shape of the original Personal Identification Signal. Moreover, for an incoming Personal Identification Signal it is impossible to create an appropriate representation without knowing processing algorithms. These two factors make the system more secure against accidental disclosures of the memory content.

Once the PIS template representation has been memorized in a portable storage device, it can be used for a wide range of system applications for the identification/verification purposes. Verification units can be existing standard devices (e.g. automatic teller machines) equipped with an input device (tactile sensor) and an inexpensive dedicated computing unit. A customer inserts/connects his portable storage device (e.g. a magnetic card) to a verification unit, and he enters his Personal Identification Signal using the tactile sensor. The segmentation of the incoming Personal Identification Signal is performed using the parameters retrieved from the portable storage device. First, the incoming Personal Identification Signal is normalized according to the retrieved normalization parameters, and secondly the strokes are extracted so that their number, length and location correspond to the retrieved segmentation parameters. Then, the feature measurements calculated for the extracted strokes of the incoming Personal Identification Signal are compared to the feature measurements retrieved from said portable storage device. If the overall distance between the calculated measurements and the measurements retrieved from said portable storage device satisfies a predetermined criterion, the incoming Personal Identification Signal is accepted. Otherwise it is rejected. The verification units do not require any connection to the external resources, so the verification process can be economically done locally.

BRIEF DESCRIPTION OF THE DRAWINGS

The present invention will become more fully understood from detailed description given hereinbelow and the accompanying drawings which are given by way of illustration only, and thus are not limitative of the present invention and wherein:

FIG. 4 is for the application of PIS in a ATM (Automatic Teller Machine) banking application.

FIG. 5 is for the application of PIS in a security and access control application.

FIG. 6 is for the application of PIS in a credit card transaction.

DESCRIPTION OF THE PREFERRED EMBODIMENT

Figure 1:
FIG 1 contains several examples of images which could be used as Personal Identification Signal.
Figure 1:
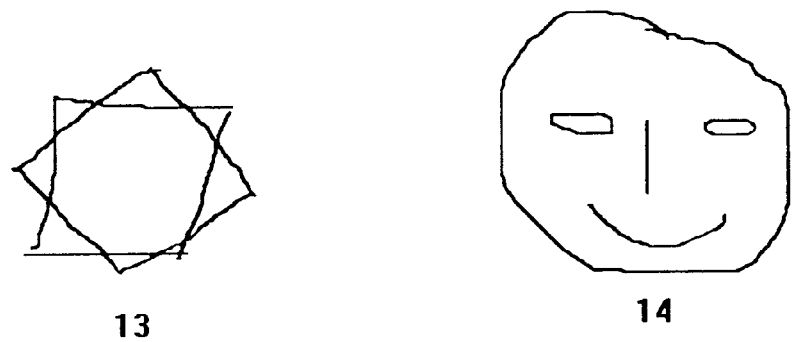

Referring to FIG. 1, a Personal Identification Signal could be any hand-drawn contour picture which is easily repeatable and can be easily memorized. This includes, for example, sequences of selected hand-written characters 11, hand-written initials 12, geometric patterns 13, simple contour pictures 14, etc.

Figure 2:
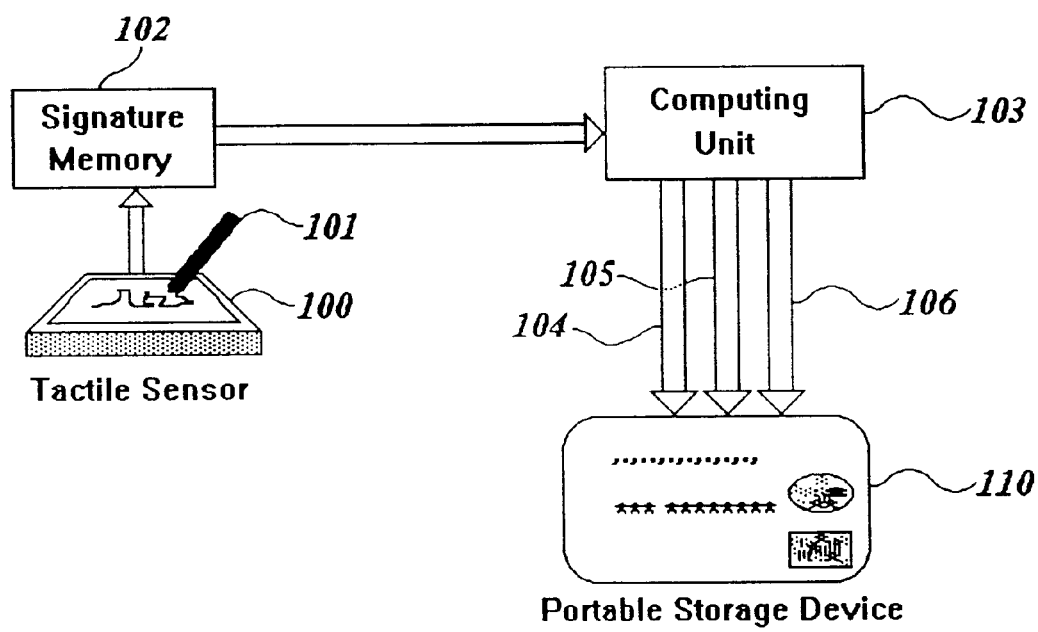
FIG. 2 is a general block diagram illustrating major components and data flow in a preferred embodiment of the central processing unit of the present invention.

The preferred embodiment of the present invention consists of two major components, i.e. a central processing unit, and of many autonomous verification units (e.g. ATM machines, security check points). The central processing unit is for capturing, memorizing and processing Personal Identification Signal templates in order to create the symbolic representation of a PIS template, and to transfer said symbolic representation data into a portable storage device prior to issuing said portable storage device to the customer who entered the PIS template. Therefore, referring to FIG. 2, the central processing unit consists of:

(a) an input tabloid (tactile sensor) 100 capturing a sequence of spatial coordinates {(x[1],y[1]), . . . , (x[N],y[N])} of the tabloid points activated by a stylus 101 so that both spatial and time-domain coordinates of an incoming Personal Identification Signal template are captured; typically the tactile sensor 100 would be a 3×4 inch touch-sensitive pad of resolution 200 DPI equipped with the necessary communication ports;

(b) a Signal memory 102 which memorizes the sequence {(x[1],y[1]), . . . , (x[N],y[N])}; typically the Signal memory 102 would be a 4 kB static memory buffer equipped with the necessary communication ports and the addressing system;

(c) a computing unit 103 running a selective algorithm which first processes the memorized sequence {(x[1], y[1]), . . . , (x[N],y[N])} representing a PIS template in order to calculate the normalization parameters 104, the segmentation parameters 105, and then computes feature measurements 106; typically the computing unit 103 would be a general purpose high-performance computer equipped with the facilities enabling data transfer to portable storage devices.

Said normalization parameters 104, segmentation parameters 105, and feature measurements 106 are memorized into a portable storage device 110 which is issued to the customer who entered the PIS template. Typical examples of parameters and features proposed for the present invention are given hereinbelow:

(i) The normalization parameters 104 are:
the total number of pixels N within said PIS template;
the standard deviation DX of horizontal coordinates (i.e. X-coordinates) within said PIS template;
the standard deviation DY of vertical coordinates (i.e. Y-coordinates) within said PIS template.

(ii) The segmentation parameters 105 are:
the number of strokes NS extracted from said PIS template; the numbers of pixels for each extracted stroke n[1], . . . , n[NS], where $$N = \sum_{i=1}^{NS} n[i].$$

(iii) The feature measurements 106 are computed for the feature:
normalized coordinates {Xc[i],Yc[i]} of the local center of gravity of the i-th stroke;
averaged coordinates {Vx[i],Vy[i]} of the relative position vector, i.e. the vector from the starting point the i-th stroke to any other point of this stroke.

Said feature measurements 106 are actually computed for truncated strokes, i.e. for said strokes with their initial and terminal pixels removed. The length of the removed fragments is proportional to the length of a stroke. The recommended number of removed fragments is 20% (i.e. 10% of the initial pixels and 10% of the terminal pixels).

The above mentioned parameters and features are given by way of illustration only, and thus are not limitative of the present invention. In general, however, it is envisaged that the overall amount of data memorized into the portable storage device 110 does not exceed 80 bytes.

Figure 3:
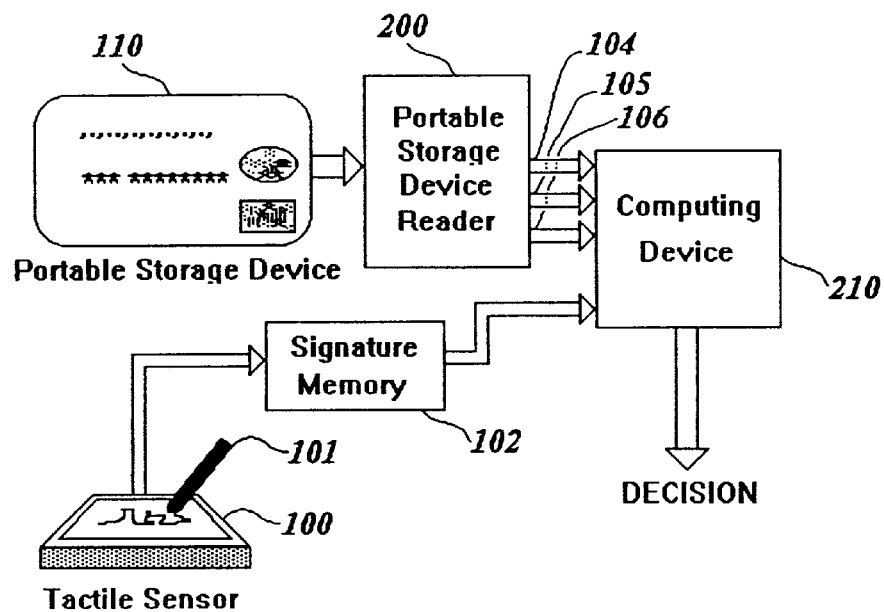
FIG. 3 is a general block diagram illustrating major components and data flow in a preferred embodiment of verification units of the present invention.

Referring to FIG. 3, an autonomous verification unit would be a standard existing device (e.g. an automatic teller machine) incorporating a portable storage device reader 200 (e.g. a magnetic card reader) which would be additionally equipped with:

(a) an input tabloid (tactile sensor) 100 capturing a sequence of spatial coordinates {(x[1],y[1]), . . . , (x[M],y[M])} of the tabloid points activated by a stylus 101 so that both spatial and time-domain coordinates of an incoming Personal Identification Signal are captured; typically the tactile sensor 100 would be a 3×4 inch touch-sensitive pad of resolution 200 DPI equipped with the necessary communication ports;

(b) a Signal memory 102 which memorizes the sequence {(x[1],y[1]), . . . , (x[M],y[M])}; typically the signal memory 102 would be a 4 kB static memory buffer equipped with the necessary communication ports and the addressing system;

(c) a computing device 210 running a selective algorithm which first normalizes and segments the memorized sequence {(x[1],y[1]), . . . , (x[M],y[M])} according to the normalization parameters 104 and the segmentation parameters 105 retrieved from the portable storage device 110, and then computes feature measurements for the strokes extracted within said sequence by the segmentation process; typically the computing device 210 would be an inexpensive specialized microcomputer device incorporating a 8/16 bit CPU, 4 kB of ROM memory, 256 B of RAM memory, and necessary communication ports. The feature measurements computed by the computing device 210 are compared to the feature measurements 106 retrieved from the portable storage device 110, and if a predetermined similarity criterion is satisfied the incoming Personal Identification Signal is accepted. Otherwise it is rejected.

To illustrate that the complexity of the algorithm performed by the computing device 210 is quite low, the following example is presented, but this is given by way of illustration only, and thus is not limitative of the present invention.

STEP 1

Acquire a random incoming PIS from the tactile sensor 100. Memorize in the memory 102 the X-coordinates and Y-coordinates of said incoming PIS. Let {x[1], x[2], ..., x[M]} and {y[1], y[2], ..., y[M]} denote said coordinates in their natural order.

STEP 2

Calculate the coordinates [Xg, Yg] of the global center of gravity of said incoming coordinates {x[1], x[2], ..., x[M]} and {y[1], y[2], ..., y[M]}.

STEP 3

Calculate the standard deviation dX of X-coordinates of said incoming PIS, and the standard deviation dY of Y-coordinates of said incoming PIS.

STEP 4

From the portable storage device 110, retrieve the standard horizontal deviation DX and the standard vertical deviation DY of the PIS template.

STEP 5

Calculate Sx=DX/dX and Sy=DY/dY.

STEP 6

Normalize said incoming PIS so that the X-coordinates {x[1], ..., x[M]} and the Y-coordinates {y[1], ..., y[M]} are substituted by {u[1], ..., u[M]} and {v[1], ..., v[M]}) correspondingly, where $$u[i]=Sx*(x[i]-Xg) \text{ and } v[i]=Sy*(y[i]-Yg) \ (i=1, \ldots, M).$$

STEP 7

From the portable storage device 110, retrieve N (the number of points within the PIS template) and NS (the number of strokes within the PIS template).

STEP 8

Calculate the value C=M/N. Set the starting point Init=1. Set the feature distance FD=0.

STEP 9

For k=1 to NS step 1, perform the Steps 10 to 15.

STEP 10

Retrieve n(k) (the length of the corresponding stroke within the PIS template) from the portable storage device 110.

STEP 11

Set the terminal point Term=Init−1+n(k)*C.

STEP 12

Create a stroke from the point Init to the point Term of said incoming PIS, and for the created stroke calculate:

$$Uc = (1-2*\alpha)*C*n(k)*\left(\sum_{Init+\alpha*C*n(k)}^{Term-\alpha*C*n(k)} u[i]\right)$$

$$Vc = (1-2*\alpha)*C*n(k)*\left(\sum_{Init+\alpha*C*n(k)}^{Term-\alpha*C*n(k)} v[i]\right)$$

$$Rx = (1-2*\alpha)*C*n(k)*\left(\sum_{Init+\alpha*C*n(k)}^{Term-\alpha*C*n(k)} (u[i]-u[Init+\alpha*C*n(k)])\right)$$

$$Ry = (1-2*\alpha)*C*n(k)*\left(\sum_{Init+\alpha*C*n(k)}^{Term-\alpha*C*n(k)} (v[i]-v[Init+\alpha*C*n(k)])\right)$$

(the recommended value of $\alpha$ is 0.1)

STEP 13

Retrieve from the portable storage device 110:
(i) the normalized coordinates [Xc(k),Yc(k)] of the center of gravity of the corresponding stroke within the PIS template;
(ii) the averaged coordinates [Qx(k),Qy(k)] of the relative position vector for the corresponding stroke within the PIS template.

STEP 14 FD=FD+abs(Xc(k)−Uc)+abs(Yc(k)−Vc)+abs(Qx(k)−Rx)+abs(Qy(k)−Ry).

STEP 15

Init=Term+1.

STEP 16 if (FD<=TH)
  accept said incoming PIS
else
  reject said incoming PIS,
where TH is a threshold value determining acceptable similarity between the incoming PIS and the PIS template.

Figure 4:
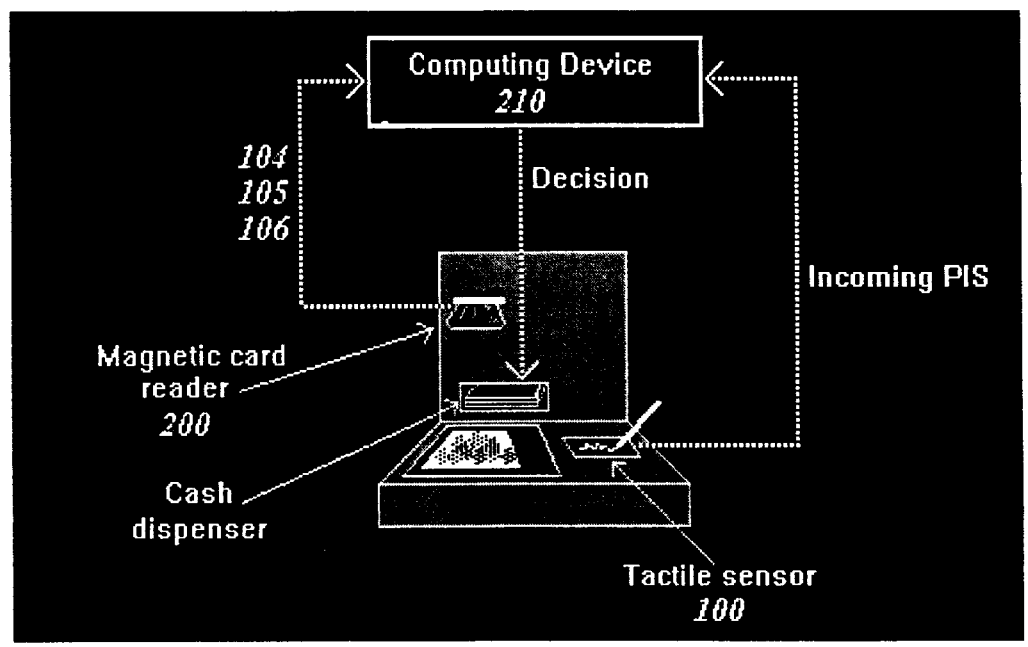
FIGS. 4, 5 and 6 show examples of applications of the present invention.
Figure 5:
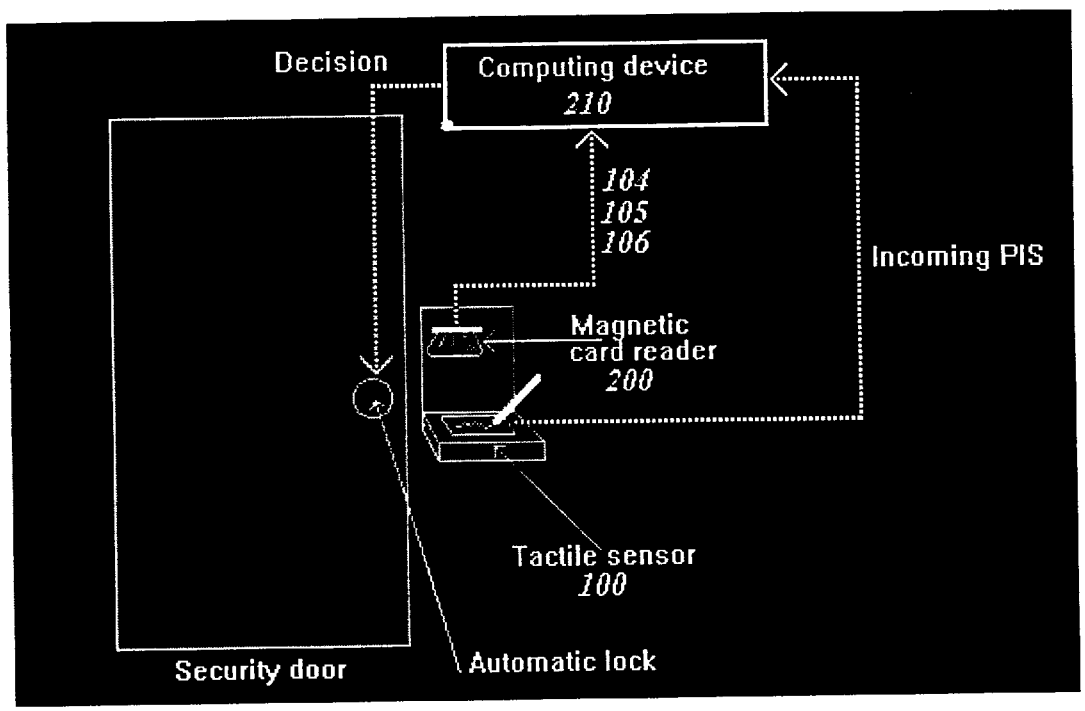
Figure 6:
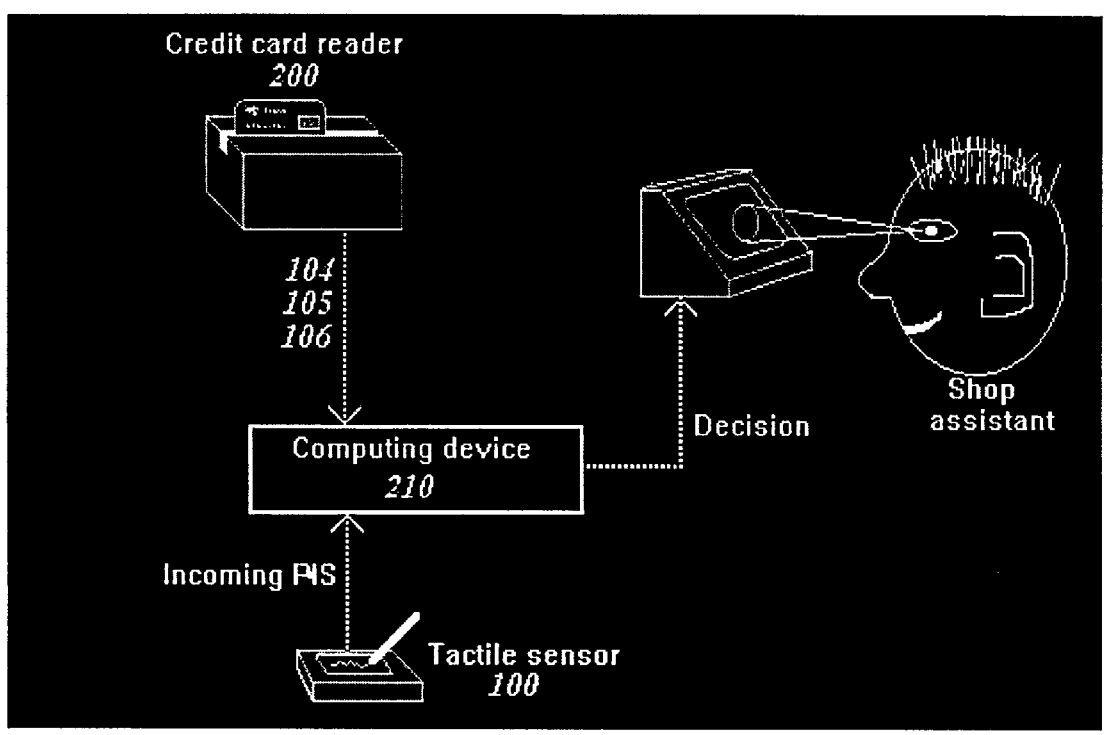

FIGS. 4, 5 and 6 show examples of applications of the present invention to illustrate diversified physical configuration of the proposed invention.

Wherein FIG. 4 is for the application of PIS in a ATM (Automatic Teller Machine) banking application., FIG. 5 is for the application of PIS in a security and access control application, and FIG. 6 is for the application of PIS in a credit card transaction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal identification system for arbitrary contour signal, wherein personalized-identification-signal (PIS) is applied, said system employs a portable storage device and/or network to store features and/or parameters according to a signal template, wherein said parameters are used for simplification of processing of an incoming test signal, said features are used for verification of said incoming test signal, said system comprising:

a single or plurality of users;

means for each of said users to select an unique personalized-identification-signal (PIS), said personalized-identification-signal (PIS) does not limit to an original signal of said user, and includes any arbitrary contour signal which can be repeatable and/or memorized by said user;

means for entering and recording said personalized-identification-signal (PIS) as an identification means for said user;

computing system means for processing and/or analyzing each of said personalized-identification-signal (PIS), said computing system includes means for extracting and/or defining a signal template for each said personalized-identification-signal (PIS), said signal template comprising:

(i) a selective set of parameters for normalization and/or segmentation of said personalized-identification-signal (PIS); and (ii) a selective set of features for representing results of said segmentation of said personalized-identification-signal (PIS);

means for using said parameters and/or said features for representing said signal template for said personalized-identification-signal (PIS); and means for a portable storage device, and/or a network means to store and/or carry said parameters and/or said features as an identification means for each of said users.

2. A system in accordance with claim 1, said system further includes verification unit means for said user, wherein each said verification unit comprises a test signal input sensor, a portable storage device reader, a network interface, and/or a selective plurality of normalization, segmentation, and/or feature measurement algorithms, said verification unit means further comprising:

(i) means for said user to enter an incoming test signal;

(ii) means for said user to insert said portable storage device into said verification unit, or through said network interface to enable said verification unit;

(iii) means for said verification unit to retrieve said parameters and/or said features from said portable storage device and/or from said network;

(iv) means for said verification unit to select an appropriate normalization, segmentation, and/or feature measurement algorithms;

(v) means for said verification unit to use said parameters for normalizing and segmenting said incoming test signal; and (vi) means for said verification unit to measure features from said incoming test signal and compare with said feature retrieved from said portable storage device or said network for determining verification/authentication of said user.

3. A system in accordance with claim 2, wherein said verification unit comprising identifier and/or descriptor means for allowing said verification unit to select an appropriate normalization, segmentation, and feature measurement algorithms.

4. A system in accordance with claim 2, wherein said verification unit further comprises means for updating and/or changing said normalization, segmentation, and/or feature measurement algorithms.

5. A system in accordance with claim 2, wherein said verification unit can further be included in a automatic teller machine, credit card transaction terminal, point of sales terminal, and/or security/access control device.

6. A system in accordance with claim 1, wherein said personalized-identification-signal (PIS) further includes sequences of selected hand-written characters, hand written initials, geometric patterns, and/or simple contour pictures.

7. A system in accordance with claim 1, wherein said personalized-identification-signal (PIS) further stores a symbolic representation including said parameters and/or said features in said portable storage device and/or network, wherein physical shape information for said PIS signal template is not disclosed.

8. A system in accordance with claim 7, without knowing algorithm selected by said verification unit, said parameters and/or said features in said portable storage devices and/or said network can not be used to derive said physical shape information of said PIS signal template for an illegal user or system.

9. A system in accordance with claim 8, wherein said signal template provide said symbolic representation of said personalized-identification-signal (PIS), said parameters for allowing normalization and/or segmentation of said signal template, and said features for characterizing strokes created by said segmentation.

10. A system in accordance with claim 9, wherein a feature based description of a signal template can be provided by a sequence of values characterizing selective properties of each of extracted strokes and of the whole signal template.

* * * * *